US009668507B2

(12) United States Patent
Richardson et al.

(10) Patent No.: US 9,668,507 B2
(45) Date of Patent: Jun. 6, 2017

(54) METHOD OF MANUFACTURING A STABILIZED EGG COMPOSITION

(71) Applicant: Fiberstar Bio-Ingredient Technologies, Inc, Eau Claire, WI (US)

(72) Inventors: Olivia Richardson, Minneapolis, MN (US); Brock M. Lundberg, Osseo, MN (US); Amanda Wagner, Woodville, WI (US)

(73) Assignee: FIBERSTAR, INC, River Falls, WI (US)

( * ) Notice: Subject to any disclaimer, the term of this patent is extended or adjusted under 35 U.S.C. 154(b) by 302 days.

(21) Appl. No.: 14/516,579

(22) Filed: Oct. 17, 2014

(65) Prior Publication Data

US 2016/0106135 A1    Apr. 21, 2016

(51) Int. Cl.
| | | |
|---|---|---|
| *A23L 1/32* | (2006.01) | |
| *A23P 30/40* | (2016.01) | |
| *A23L 29/262* | (2016.01) | |
| *A23L 15/00* | (2016.01) | |

(52) U.S. Cl.
CPC ............ *A23L 1/3212* (2013.01); *A23L 15/30* (2016.08); *A23L 29/262* (2016.08); *A23P 30/40* (2016.08)

(58) Field of Classification Search
CPC ...... A23L 1/3212; A23L 29/262; A23L 15/30; A23P 30/40
See application file for complete search history.

(56) References Cited

U.S. PATENT DOCUMENTS

| | | | | |
|---|---|---|---|---|
| 3,403,031 | A * | 9/1968 | Holmes | A23G 9/04 |
| | | | | 426/565 |
| 4,232,049 | A | 11/1980 | Blake | |
| 4,413,017 | A | 11/1983 | Loader | |
| 5,352,709 | A * | 10/1994 | Tarrant | C08J 9/00 |
| | | | | 521/109.1 |
| 6,506,435 | B1 | 1/2003 | Lundberg et al. | |
| 7,074,300 | B2 | 7/2006 | Lundberg et al. | |
| 7,582,213 | B2 | 9/2009 | Lundberg et al. | |
| 8,399,040 | B2 | 3/2013 | Lundberg et al. | |
| 2002/0039615 | A1 * | 4/2002 | Adachi | A21D 2/183 |
| | | | | 426/573 |
| 2003/0116289 | A1 | 6/2003 | Lundberg et al. | |
| 2004/0086626 | A1 | 5/2004 | Lundberg et al. | |
| 2005/0074542 | A1 | 4/2005 | Lundberg et al. | |
| 2005/0238781 | A1 * | 10/2005 | Shukla | A23G 9/32 |
| | | | | 426/565 |
| 2005/0271790 | A1 * | 12/2005 | Aronson | A21D 2/188 |
| | | | | 426/601 |
| 2005/0274469 | A1 | 12/2005 | Lundberg et al. | |
| 2006/0210687 | A1 | 9/2006 | Lundberg et al. | |
| 2008/0166464 | A1 * | 7/2008 | Lundberg | A21D 2/261 |
| | | | | 426/551 |
| 2011/0244104 | A1 * | 10/2011 | Dose | A23G 9/14 |
| | | | | 426/567 |
| 2012/0142909 | A1 | 6/2012 | Lundberg et al. | |
| 2014/0134219 | A1 * | 5/2014 | Bonner | A61Q 5/12 |
| | | | | 424/401 |
| 2015/0366256 | A1 * | 12/2015 | Book | A23L 1/3212 |
| | | | | 426/298 |

FOREIGN PATENT DOCUMENTS

| | | | |
|---|---|---|---|
| CN | 101843287 | * | 9/2010 |
| EP | 0574907 | * | 12/1993 |
| FR | 2850245 | * | 7/2004 |
| JP | 01218554 | * | 8/1989 |

OTHER PUBLICATIONS

English Translation for FR2850245 published Jul. 2004.*
English Translation for EP0574907 published Dec. 1993.*
Rohrig. Ice, Cream . . . and Chemistry. ChemMatters. Feb. 2014. www.acs.org/chemmatters.*
English Translation for CN101843287 published Sep. 2010.*
Derwent Abstract for JP 01218554 published Aug. 1989.*

* cited by examiner

*Primary Examiner* — Anthony Weier
(74) *Attorney, Agent, or Firm* — Mark A. Litman & Associates, P.A.

(57) ABSTRACT

The present technology may include a stabilized mass of egg composition having both yolk and albumin components whipped together and stabilized against separation by highly refined cellulose fiber material. The yolk and albumin components may be whipped into a foam in which at least 1% by volume of the foamed material comprises a gas, such as air, carbon dioxide, or nitrogen. The mass may flow as a liquid at 20 C and 760 mm Hg atmospheric pressure and 40% relative humidity. The mass may be in a frozen state. The mass may be in a dried powder state or dried solid mass.

10 Claims, No Drawings

METHOD OF MANUFACTURING A STABILIZED EGG COMPOSITION

BACKGROUND OF THE INVENTION

1. Field of the Invention

The present invention relates to the field of whipped egg materials, in liquid, gel, dry, frozen or prepackaged format.

2. Background of the Art

Eggs are used in a large number of edible products. They may be used in essentially physically undisturbed form (e.g., cooked within the shell). Cooked without modification when removed from the shell (e.g., poached, fried), lightly mixed with other ingredients (as with batter product preparations) or they may be whipped (yolks and albumin separately or together, with or without additional ingredients, such as sugar in forming meringues). One of the problems with whipped egg products, whether both the yolk and albumin are present or when either one is with another ingredient in the whipped mass, there tends to be separation between the two ingredients.

There is a distinct different between beating whole eggs and egg whites. When whites (the albumin) are whipped by themselves (e.g., without the yolk) or with additives (e.g., sugar), the eggs whites can be whipped into a relatively, but short term stable mass, even or ideally displaying stable peaks in the whipped albumin. There are a number of precautions that can or should be taken to optimize peak formation, such as avoiding the presence of any yolk, avoidance of aluminum bowls and avoidance of wooden bowls.

In whipping whole eggs (yolk and albumin) starch has long been used to attempt to stabilize the product. This is especially done in the formation of custards. The starch is usually dispersed in water or aqueous carriers and then mixed with the whipped eggs and then mixed again with the combined ingredients, then baked or chilled. There are a number of deficiencies in this method, particularly the fact that most starches (e.g., not rice starch) contain glutens. An increasing portion of the population is gluten-intolerant, and there is increasing evidence of the adverse health benefits of modern strains of gluten-containing grains. Additionally, the stability of these combinations tends to evidence itself in the final cooked product and not in the intermediate storable or pre-cooked product.

SUMMARY OF THE INVENTION

The present technology may include a stabilized mass of egg composition comprising both yolk and albumin components whipped together and stabilized against separation by highly refined cellulose fiber material. The yolk and albumin components may be whipped into a foam in which at least 1% by volume of the foamed material comprises a gas, such as air, carbon dioxide, or nitrogen. The mass may flow as a liquid at 20 C and 760 mm Hg atmospheric pressure and 40% relative humidity. The mass may be in a frozen state. The mass may be in a dried powder state or dried solid mass.

DETAILED DESCRIPTION OF THE INVENTION

One aspect of this technology is to show the benefits of adding highly refined cellulose, and especially Citri-Fi™ fiber additives (often referred to herein as "CF") to whole egg products for its binding and stabilizing benefits, especially as an agent to assist with whipping of the whole egg product. A "whole egg" product according to the present technology is one that contains both substantial amounts (at least 10% by weight of the total egg mass) of each of yolk and albumin, therefore covering masses of 10% yolk and 90% albumin through 10% albumin and 90% yolk by weight.

The present technology may include a mass of egg composition comprising both yolk and albumin components whipped together and stabilized against separation by highly refined cellulose fiber material. The yolk and albumin components may be whipped into a foam in which at least 1% by volume of the foamed material comprises a gas, such as air, carbon dioxide, or nitrogen. The mass may flow as a liquid at 20 C and 760 mm Hg atmospheric pressure and 40% relative humidity. The mass may be in a frozen state. The mass may be in a dried powder state or dried solid mass.

A method of manufacturing a stabilized egg composition may have steps of: providing a liquid mass of egg composition comprising both yolk and albumin; combining the liquid mass of egg composition with a highly refined cellulose fiber material present as at least 0.05% by weight of the liquid egg composition; and stirring the combined egg composition and fiber material into a foamed material. The foamed material is dried into a dried foam composition. The foam composition is frozen. The fiber may constitute from 0.05% to 8% by total weight of the liquid egg composition.

Highly refined cellulose materials (HRC materials) are well known in the literature and are disclosed, for example, in U.S. patent application Ser. No. 11/440,603, filed May 25, 2006 (US Publication No. 2006/0210687 A1), which is in turn a continuation-in-part of U.S. patent application Ser. No. 11/165,430, filed Jun. 30, 2005 (US Publication No. 2005/0271790 A1), titled "REDUCED FAT SHORTENING, ROLL-IN, AND SPREADS USING CITRUS FIBER INGREDIENTS," which is a continuation-in-part of U.S. patent application Ser. No. 10/969,805, filed 20 Oct. 2004 (US Publication No. 2005/0074542 A1), and titled "HIGHLY REFINED CELLULOSIC MATERIALS COMBINED WITH HYDROCOLLOIDS," which is a continuation-in-part of U.S. patent application Ser. No. 10/288,793, filed Nov. 6, 2002 (US Publication No. 2004/0086626 A1), titled "HIGHLY REFINED FIBER MASS, PROCESS OF THEIR MANUFACTURE AND PRODUCTS CONTAINING THE FIBERS." The enzymatically modified highly refined cellulose fibers of U.S. patent application Ser. No. 12/958,118, filed 1 Dec. 2010 (US Publication No. 2012/0142909 A1) are also useful in the practice of the present technology, and that application is incorporated herein by reference in its entirety. Issued U.S. patents of the inventor such as U.S. Pat. Nos. 8,399,040; 7,582,213; 7,074,300; and 6,506,435 are also incorporated by reference in their entirety, Procedures 1) Liquid Whole Eggs The Citri-Fi™ fiber and whole egg blend samples will be processed using batch or continuous commercial production lines. Whole eggs were pasteurized at temperature greater than 141° F. and held for greater than 3.5 min) and then cooled to less than 40° F. After processing, liquid blends may be packaged into 10-lbs aluminum Scholle™ bags.

For shelf life testing, the processed eggs were evaluated at four weeks for the standard shelf life (SSL) whole egg product and 12 weeks for the extended shelf life (ESL) blends. Total plate count, major pathogens including *Salmonella*, *Listeria monocytogenes*, *E. Coli* 0157H7., pH, and sensory properties (viscosity, color) will be measured when the product is first made and at the end of the typical shelf life, i.e., 4 weeks for SSL and 12 weeks for ESL.

The functional property that will be tested is whip/foam stability. Below is the procedure for the whipping test:

Whipping Test Procedure
1. A 400 mL solution is required for the whip testing. For the test formulas, slowly mix in Citri-Fi™ fiber (the amount is listed in formulation tables below) using an overhead stirrer (IKA RW 20) with a four-bladed propeller.
2. Pour the solution in a Hobart mixer (Model A-200).
3. Attach wire whip and mix on speed "3" for 5 minutes.
4. Remove bowl and measure density using a 100 mL graduated cylinder.
5. Record weight/volume and repeat the test after one hour. Note that if the foam is not stable over time, a layer of liquid will begin to form at the bottom of the graduated cylinder. The mL's of liquid versus foam will then be measured. For measuring the one hour density, if a liquid layer has formed subtract that amount from the original volume measured to compare the change in density over time.

Here are the liquid whole egg formulas that have been tested:

| Ingredient | Control (%) | Test A (%) | Test B (%) |
|---|---|---|---|
| Plain liquid egg | 100 | 95 | 75 |
| Water | X | X | 18.64 |
| Citri-Fi 200 FG | X | X | 1.36 |
| Sugar (granulated) | X | 5 | 5 |
| Total | 100% | 100% | 100% |

2) Frozen Eggs

Frozen whole eggs have been prepared using the same process outlined above for the liquid whole eggs with the difference that they have been frozen after processing. Similar to the liquid whole egg testing, the functional property that was tested in the frozen liquid whole egg is whip/foam stability. See Whipping Test Procedure Liquid egg samples have been be prepared, frozen for two days at 9° F., and then thawed to room temperature prior to the whipping evaluation.

Here are the frozen liquid whole egg formulas tested:

| Ingredient | Test A (%) | Test B (%) | Test C (%) |
|---|---|---|---|
| Plain liquid whole egg | 95 | 75 | 80 |
| Water | X | 18.64 | 18.25 |
| Citri-Fi 100 FG | X | X | 1.77 |
| Citri-Fi 200 FG | X | 1.36 | X |
| Sugar (granulated) | 5 | 5 | X |
| Total | 100% | 100% | 100% |

3) Dried Whole Eggs

Dried whole egg has functional benefits, such as aerating, leavening, binding, and emulsifying. However, it is common knowledge that dried whole eggs are susceptible to some heat damage during drying. As the product is dried to the typical levels of 3-4% moisture, the amount of heat the product absorbs becomes more important. Typically sugar is added to reduce heat damage. The ingredient, i.e., Citri-Fi® fiber, added to whole egg prior to drying can act as a form of protection to the egg product during drying. In this test the amount of sugar co-dried with the whole egg samples will be 25% (dry weight basis). It is anticipated that the Citri-Fi can either by itself or in conjunction with added sugar have similar protection capability in maintaining the natural functional properties of the whole egg.

To test this concept, a formulation consisting of whole eggs both with and without Citri-Fi will be dried and resultant product tested. The dried whole egg will be hydrated at 1:3 (dried whole egg:water). Again, the functional property that will be tested in the dried whole egg is whip/foam stability. Once the dried whole eggs are hydrated, the same Whipping Test Procedure will be used.

Here are the dried whole egg formulas that will be tested:

| Ingredient | Control (%) | Test A (%) | Test B (%) | Test C (%) |
|---|---|---|---|---|
| Dried whole egg | X | X | 20 | 5 |
| Dried whole egg co-processed with Citri-Fi 200FG | X | 25 | X | X |
| Whole dried egg co-dried with sugar (25%) | 25 | X | X | 20 |
| Water | 75 | 75 | 60 | 75 |
| Additional water | X | X | 18.64 | X |
| Citri-Fi 200 FG | X | X | 1.36 | X |
| Sugar (granulated) | X | X | X | 5 |
| Total | 100% | 100% | 100% | 100% |

Results

A.) Liquid Eggs:

Significant foam settling separation was seen in the Control (plain liquid egg) and Test A (plain liquid egg with 5% sugar) one hour after the whipping test was performed (Table 1). Comparatively, Test B (plain liquid egg with CF 200FG and 5% sugar) maintained stability after one hour, and also had a lower initial density. The separation seen with the Test A formula was readily observable without instrumentation.

TABLE 1

Liquid Egg Testing Results

| Ingredient | Control (%) | Test A (%) | Test B (%) |
|---|---|---|---|
| Plain liquid egg | 100 | 95 | 75 |
| Water | X | X | 18.64 |
| CF 100 FG | X | X | X |
| CF 200 FG | X | X | 1.36 |
| Sugar (granulated) | X | 5 | 5 |
| Total | 100% | 100% | 100% |
| Initial Density (g/mL) | 0.279 | 0.294 | 0.245 |
| 1 hr Density (g/mL) | 0.39 | 0.354 | 0.245 |
| Observations | Settling of foam at 26 mL | Settling of foam at 17 mL | No change |

In the frozen eggs, foam settling was seen in Test A (plain liquid egg with 5% sugar), while Test B (plain liquid egg with CF 200FG and 5% sugar), and Test C (plain liquid egg with CF 100FG) maintained a stable foam over time (Table 2). Initial density values were comparable between all three variables.

TABLE 2

Frozen Liquid Egg Testing Results

| Ingredient | Test A (%) | Test B (%) | Test C (%) |
|---|---|---|---|
| Plain liquid egg | 95 | 75 | 80 |
| Liquid egg co-processed with CF 200FG | X | X | X |
| Water | X | 18.64 | 18.25 |
| CF 100 FG | X | X | 1.77 |
| CF 200 FG | X | 1.36 | X |
| Sugar (granulated) | 5 | 5 | X |
| Total | 100% | 100% | 100% |
| Initial Density (g/mL) | 0.327 | 0.334 | 0.34 |
| 1 hr Density (g/mL) | 0.344 | 0.334 | 0.34 |
| Observations | Settling of foam at 5 mL | No change | No Change |

*no images available for frozen liquid egg whipping test

A.) Dried Eggs:

In dried eggs, significant foam settling was seen in the Test C (plain dried egg with whole dried egg co-dried with sugar, plus 5% sugar) and the Control (Whole dried egg co-dried with sugar). Minimal settling to no settling was seen in Test A (dried egg co-processed with CF 200FG) and Test B (dried plan egg with CF 200FG), which is also shown in FIG. 2. The densities of the dried egg variables without the addition of CF 200FG had significant foam separation and an increase in density. In Test C (plain dried egg with whole dried egg co-dried with sugar, plus 5% sugar), the density nearly tripled after one hour.

TABLE 3

Dried Egg Testing Results

| Ingredient | Control (%) | Test A (%) | Test B (%) | Test C (%) |
|---|---|---|---|---|
| Dried plain egg | X | X | 20 | 5 |
| Dried egg co-processed with CF 200FG | X | 25 | X | X |
| Whole dried egg co-dried with sugar (25%) | 25 | X | X | 20 |
| Water | 75 | 75 | 60 | 75 |
| Add'l water | X | X | 18.64 | X |
| CF 100 FG | X | X | X | X |
| CF 200 FG | X | X | 1.36 | X |
| Sugar (granulated) | X | X | X | 5 |
| Total | 100% | 100% | 100% | 100% |
| Initial Density (g/mL) | 0.361 | 0.385 | 0.663 | 0.47 |
| 1 hr Density (g/mL) | 0.516 | 0.405 | 0.663 | 1.175 |

TABLE 3-continued

Dried Egg Testing Results

| Ingredient | Control (%) | Test A (%) | Test B (%) | Test C (%) |
|---|---|---|---|---|
| Observations | Settling of foam at 30 mL | Settling of foam at 5 mL | No change | Settling of foam at 40 mL |

D. Shelf Life Evaluation:

The results suggested that both the ESL and the SSL liquid Citri-Fi and whole egg blends can successfully achieve the designed shelf life with minimal microbial safety challenge and quality alteration. The interactions between Citri-Fi and egg components during storage are minimal and resultant changes in egg safety and functionality is not significant. The property tested on day-1 samples in comparison with that on the 12-week for ESL and that on 4-week for SSL are summarized in Table 1 below. The cake function for the egg samples both in the beginning and at the end of their shelf life were good.

TABLE 1

Comparison between samples at day-1 and at end of shelf life

| | ESL blend | | | | | | SSL Blend | | | | | |
|---|---|---|---|---|---|---|---|---|---|---|---|---|
| Test | TPC* | | Vis | Cake** | Color | | TPC* | | Vis | Cake** | Color | |
| dates | cfu/ml | pH | (cP) | function | L | a | b | cfu/ml | pH | (cP) | function | L | a | b |
| Day-1 | <10 | 6.9 | 1080 | good | 71 | 14 | 46 | <10 | 6.9 | 333 | good | 68 | 16 | 53 |
| 4-wk | | | | | | | | <10 | 6.9 | 267 | good | 67 | 16 | 50 |
| 12-wk | <10 | 6.8 | 1780 | good | 71 | 13 | 45 | | | | | | | |

TPC*--all samples were tested for major pathogens including *Salmonella*, *Listeria*, *E. Coli* O157:H7 and found negative both at the beginning and at the end of the shelf life tested. Therefore, no pathogen test results reported in this table and only TPC reported herein.

Conclusions:

In liquid eggs, adding CF 200FG and 5% sugar improves foam stability in liquid whole egg over time as a result of the emulsification properties in the citrus fiber. The whipping/aeration properties of the liquid egg are also improved, which suggests more air is incorporated into the foam, thus resulting in a lower density.

In frozen eggs, adding CF 200FG and 5% sugar or adding CF 100FG improve foam stability in liquid whole egg over time as a result of the emulsification properties in the citrus fiber. Although the densities are comparable between all three variables immediately after the whipping test, the addition of the Citri-Fi products maintains the density over time.

In dried eggs, adding CF 200FG to dried plain egg or co-processing liquid egg with CF 200FG improve foam stability in liquid whole egg over time as a result of the emulsification properties in the citrus fiber. This suggests that less air is incorporated into the foam, thus resulting in an unstable foam, and an increasing density over time.

The shelf life of the liquid egg blends made with Citri-Fi are similar to the control liquid egg products. Microbiological testing indicated the product held up well throughout the shelf life and the viscosity and appearance also minimally changed.

It is important to note the difference in the practice of the present technology of the term "highly refined cellulose" product as compared to the more conventional material referred to as "dietary fiber." Many teachings of baked products including cracker products include the use of dietary fiber as one method of improving dietary or nutritional benefits in the baked good. Dietary fiber generally refers to the use of bulk fiber material, usually in its less processed state (e.g., dried but not highly sheared) so that the fiber remains substantially intact and even cell wall structure and cell morphology can be readily seen under microscopic examination (e.g., 40× to 500× examination).

Published U.S. Patent Applications Nos. 20050274469; 20050271790; 20050074542; 20040086626; and 20030116289 disclose highly refined cellulose materials.

Prior art results according to the Chen patents were WRC values were measured for both the aqueous HRC gel and dried HRC powder using a process that used NaOH concentrations ranging from about 0.004 to 0.025 g NaOH/g water. The WRC values for both the HRC gel and HRC powder were in the range of about 20 to at least about 56 g $H_2O$/g dry HRC, depending on the concentration of the alkaline solutions as measured by AACC 56-10 at varying solids content, which were typically less than 5% and most commonly at 1%. Maximum WRC values for the gel of at least about 56 g $H_2O$/g dry HRC were obtained with a NaOH concentration of about 0.007 g NaOH/g $H_2O$. Drying the HRC gel resulted in a reduction of about three (3) to 15% in WRC, which may be attributed to structural damages such as recrystallization caused by dehydration. However, the HRC powder also exhibited high WRC values, having a maximum WRC value of at least about 56 g $H_2O$/g dry HRC at a NaOH concentration of about 0.007 g NaOH/g $H_2O$. Compared with WRC values for even earlier prior art HRC products of 3.5 to 10 g water/g dry powdered cellulose reported by Ang and Miller in Cereal Foods World, Multiple Functions of Powdered Cellulose as a Food Ingredient, Vol. 36 (7): 558-564 (1991), it was shown that both the HRC gel and powder of the Chen patents had a much higher water-holding capacity than prior art materials known at the time of the invention.

Determination of Water-Retention Capacity (WRC) and Oil-Retention Capacity (ORC) WRC is a measure of the amount of water retained under standard centrifuge. The WRC values for both aqueous HRC gel and freeze-dried HRC were determined in accordance with Method 56-10 of the American Association of Cereal Chemists (AACC), except the water holding capacities were measured in a 1% hydrated state. In the ORC (oil retention capacity) test, the same procedure was used except oil was used instead of water.

Determination of Pore Size and Microsurface Area Both the pore size and the microsurface area of freeze-dried HRC samples were measured using a Micromeritics™ 2000 from Micromeritice Instrument Co. The test sample was weighed with a precision of 0.0001 g. In all cases, the test sample weight was more than 100 mg to reduce the effect of weighing errors. At 85° C. and 6 mmHg vacuum, the sample was degassed, and moisture and other contaminants were removed. The degassed sample was analyzed in a nitrogen gas environment. Average pore diameter, BET surface area and Langmuir surface area were measured. The BET surface area values were determined by calculating the monolayer volume of adsorbed gas from the isotherm data. The Langmuir surface area values were obtained by relating the surface area to the volume of gas adsorbed as a monolayer.

Results and Discussion—Pore Size and Surface Area

Average pore size is a measure of openness of the HRC structure. The average pore size increased rapidly as NaOH concentration was increased to 0.007%, then slowly with further increase in NaOH concentration. The surface area reached a maximum value at 0.007% NaOH, which also coincides with the maximum WRC discussed above. The decrease in surface area after the maximum value seems to suggest an increase in the ratio of large pores to small pores, which may contribute to the decrease in total surface area. In one embodiment, the processes of the Lundberg Application removes lignin to a sufficient degree or substantially inactivates it such that undesirable fiber clumping does not occur There is not a large apparent difference in terms of WHC/viscosity between the two products (the Chen product and the product of the Lundberg Application) in a wet form, but there is a significant and commercially and technically important difference between the products/processes is that 1) Chen never provided a method for drying the gel product or 2) rehydrating the dry product. Additionally, 3) the present process for citrus has no required chemical treatment and does not need any mechanical treatments to produce a dry product that rehydrates to a high WHC/viscosity gel. Additionally, there is less concern about all the surface area, and pore size measurements.

It is desired that the highly refined cellulose fiber materials used in the practice of the present technology have the following properties. The HRC materials should provide a viscosity of at least 200 cps (preferably at least 300 cps) at 20 C in a concentration of 3% in deionized water after mild stirring for 4 hours, a water retention capacity of at least 8× the dry weight of fiber (preferably at least 10×, at least 15× and at least 20×), which may also be determined by filtering saturated fiber mass, draining excess water (e.g., under mild pressure of 50 g/10 cm² for three minutes), weighing the drained wet fiber mass, then dehydrating the drained mass (to less than 5% water retention/weight of the fiber) and weighing the dried product to determine the amount of absorbed water removed. This latter method is less preferred, but can address the issue that drying of fibers often changes their physical properties, and particularly dried fibers (unless additionally sheared) often lose WRC after drying.

A highly refined cellulosic material (e.g., cellulose, modified celluloses, derivatized celluloses, hemicellulose, lignin, etc.) product can be prepared by generally moderate treatment and still provide properties that are equivalent to or improved upon the properties of the best highly refined cellulose products produced from more intense and environmentally unfriendly processes. Fruit or vegetable cells with an exclusively parenchymal cell wall structure can be treated with a generally mild process to form highly absorbent microfibers. Cells from citrus fruit and sugar beets are particularly available in large volumes to allow volume processing to generate highly refined cellulose fibers with both unique and improved properties. These exclusively parenchymal microfibers (hereinafter referred to as EPM's) have improved moisture retention and thickening properties that enable the fibers to provide unique benefits when combined into edible products (e.g., baked goods, liquefied foods, whipped foods, meats, meat fillers, dairy products, yogurt, frozen food entrees, ice cream, etc.) and in mixtures that can be used to generate edible food products (e.g., baking ingredients, dehydrated or low hydration products).

A new process for making HRC cellulose from parenchyma cell wall products, e.g. citrus fruit and sugar beets by-products, is performed in the absence of a hydroxide soaking step. This is a significant advance over the prior art as described by the Chen and Lundberg patents. Dinand, et al. (U.S. Pat. No. 5,964,983) also recommends the use of a chemical treatment step in addition to bleaching. In the present invention we are able to attain higher functionality (measured as viscosity) compared to Dinand et al. even though we use less chemical treatment, which is likely due to the higher amount of shear and chemical energy we put into the materials. The product is able to display the same or improved water retention properties and physical properties of the more strenuously refined agricultural products of the prior art, and in some cases can provide even higher water retention values, thickening and other properties that can produce unique benefits in particular fields of use.

General descriptions of the invention include a highly refined cellulose product comprising microfibers derived from organic fiber plant mass comprising at least 50% by weight of all fiber mass as parenchymal fiber mass, the highly refined cellulose product having an alkaline water retention capacity of at least about 25 g $H_2O$/g dry highly refined cellulose product and methods for providing and using these products. The highly refined cellulose product may have a water retention capacity of at least 50 g $H_2O$/g dry highly refined cellulose product.

Parenchymal cell walls refer to the soft or succulent tissue, which is the most abundant cell wall type in edible plants. For instance, in sugar beets, the parenchyma cells are the most abundant tissue the surrounds the secondary vascular tissues (xylem and phloem). Parenchymal cell walls contain relatively thin cell walls compared to secondary cell walls are tied together by pectin (Haard and Chism, 1996, Food Chemistry. Ed. By Fennema. Marcel Dekker NY, NY) In secondary cell walls (xylem and phloem tissues), the cell walls are much thicker than parenchymal cells and are linked together with lignin (Smook). This terminology is well understood in the art.

As used in the practice of the present invention, the term "dry" or "dry product" refers to a mass that contains less than 15% by weight of fibers as water.

The organic fiber mass comprises at least 50% by weight of fiber mass from organic products selected from the group consisting of sugar beets, citrus fruit, grapes, tomatoes, chicory, potatoes, pineapple, apple, carrots and cranberries. A food product or food additive may have at least 0.05 percent by weight solids in the food product or food additive of the above described highly refined cellulose product. The food product may also have at least about one percent or at least about two percent by weight of the highly refined cellulosic fiber of the invention.

A method for refining cellulosic material may comprise:

soaking raw material from organic fiber plant mass comprising at least 50% by weight of all fiber mass as parenchymal fiber mass in an aqueous solution with less than 1% NaOH;

draining the raw material and allowing the raw material to sit for a sufficient period under conditions (including ambient conditions of room temperature and pressure as well as accelerated conditions) so that the fibers and cells are softened so that shearing can open up the fibers to at least 40%, at least 50%, at least 60%, or at least 70, 80, 90 or 95% of their theoretic potential. This will usually require more than 4 hours soaking to attain this range of their theoretic potential. It is preferred that this soaking is for more than 5 hours, and preferably for at least about 6 hours. This soaking time is critical to get the materials to fully soften. When such a low alkaline concentration is used in the soaking, without the set time, the materials do not completely soften and cannot be sheared or opened up to their full potential. This process produces soaked raw materials; and the process continues with refining the soaked raw material to produce refined material; and drying the soaked raw material.

The process may perform drying by many different commercial methods, although some display improved performance in the practice of the present invention. It is preferred that drying is performed, at least in part, by fluid bed drying or flash drying or a combination of the two. An alternative drying process or another associated drying step is performed at least in part by tray drying. For example, fluid bed drying may be performed by adding a first stream of organic fiber plant mass and a second stream of organic fiber plant mass into the drier, the first stream having a moisture content that is at least 10% less than the moisture content of the second stream or organic fiber plant mass. The use of greater differences in moisture content (e.g., at least 15%, at least 20%, at least 25%, at least 40%, at least 50% weight-to-weight water percent or weight-to-weight water-to-solid percent) is also within the scope of practice of the invention. In the drying method, the water may be extracted with an organic solvent prior to drying. In the two stream drying process, the second stream of organic fiber plant mass may have at least 25% water to solids content and the first stream may have less than 15% water to solids content. These processes may be practiced as batch or continuous processes. The method may use chopping and washing of the cellulose mass prior to soaking.

Another description of a useful process according to the invention may include draining and washing the soaked raw material in wash water to produce washed material; bleaching the washed material in hydrogen peroxide to produce a bleached material; and washing and filtering the bleached material to produce a filtered material.

The drying of an expanded fiber material according to the invention may use room temperature or higher air temperatures that dry the expanded fiber product and maintain the fiber material's functionalities of at least two characteristics of surface area, hydrogen bonding, water holding capacity and viscosity. It is also useful to use backmixing or evaporating to bring the organic fiber plant mass to a solids/water ratio that will fluidize in air in a fluid bed air dryer. This can be particularly performed with a method that uses a fluid bed dryer or flash dryer to dry the expanded or highly refined cellulosic fiber product.

The use of a flash or fluid bed dryer is an advantage over the drying methods suggested by Dinand et al. We have found that through the use of a fluid bed or flash dryer, low temperatures and controlled humidity are not needed to dry the materials of the present invention. In fact, although nearly any drying temperature in the fluid bed or flash dryer can be used, we have dried ° the product of the present invention using high air temperatures (400 F) and attained a dry product with near equivalent functional properties after rehydration compared to the materials before drying. Additionally, using the process of the present invention, any surface area expanded cellulosic product can be dried and a functional product obtained and is not limited to parenchyma cell wall materials. The use of a fluid bed or flash dryer, the use of relatively high drying air temperatures (400° F.+), and the ability to dry non parenchyma cell wall (secondary cell) and obtain a functional product is in great contrast to the relatively low temperatures, e.g., 100° C. (212 F) and dryer types taught by Dinand et al to dry expanded parenchymal cell wall materials.

The University of Minnesota patent application (Lundberg et al), describes the ability to obtain a functional dried product. However, the only way they were able to obtain a functional dry product was through freeze drying (Gu et al, 2001). —from (Gu, L., R Ruan, P. Chen, W. Wilcke, P. Addis. 2001. *Structure Function Relationships of Highly Refined Cellulose. Transactions of the ASAE*. Vol 44(6): 1707-1712). Freeze drying is not an economically feasible drying operation for large volumes of expanded cell wall products.

The fiber products of the invention may be rehydrated or partially rehydrated so that the highly refined cellulose product is rehydrated to a level of less than 90 g $H_2O$/g fiber mass, 70 g $H_2O$/g fiber mass, 50 g $H_2O$/g fiber mass or rehydrated to a level of less than 30 g $H_2O$/g fiber mass or less than 20 g $H_2O$/g fiber mass. This rehydration process adjusts the functionalities of the product within a target range of at least one property selected from the group consisting of water holding capacity, oil holding capacity, and viscosity and may include the use of a high shear mixer to rapidly disperse organic fiber plant mass materials in a solution. Also the method may include rehydration with soaking of the dry materials in a solution with or without gentle agitation.

The HRC dispersion of the present invention is a highly viscous, semi-translucent gel. HRC embodiments comprise dried powders that are redispersable in water to form gel-like solutions. The functional characteristics of HRC are related to various properties, including water- and oil-retention capacity, average pore size, and surface area. These properties inherently relate to absorption characteristics, but the properties and benefits provided by the processes and products of the invention seem to relate to additional properties created in the practice of the invention.

The present invention also includes an aqueous HRC gel having a lignin concentration of about one to twenty percent (1 to 20%). The HRC products of the present invention exhibit a surprisingly high WRC in the range of about 20 to at least about 56 g $H_2O$/g dry HRC. This high WRC is at least as good as, and in some cases, better than the WRC of prior art products having lower or the same lignin concentrations. The HRC products exhibit some good properties for ORC (oil retention capacity).

The resulting soaked raw material is subjected to another washing and draining. This washing and additional washing and draining tend to be more meaningful for sugar beets, potatoes, carrots (and to some degree also tomatoes, chicory, apple, pineapple, cranberries, grapes, and the like) than for citrus material. This is because sugar beets, potatoes, carrots, growing on the ground rather than being supported in bushes and trees as are citrus products, tend to pick up more materials from the soil in which they grow. Sugar beets and carrots tend to have more persistent coloring materials (dyes, pigments, minerals, oxalates, etc.) and retained flavor that also are often desired to be removed depending upon their ultimate use. In one embodiment, the soaked raw material is washed with tap water. In one other embodiment, the material is drained. This is optionally followed by bleaching the material with hydrogen peroxide at concentrations of about one (1) to 20% (dry basis) peroxide. The bleaching step is not functionally necessary to effect the citrus and grape fiber conversion to highly refined cellulose. With respect to carrots and sugar beets, some chemical processing may be desirable, although this processing may be significantly less stressful on the fiber than the bleaching used on corn-based HRC products. From our experience, some chemical step is required for sugar beets, and bleaching is one option. Using alkaline pretreatment baths is another option. Acid treatment or another bleaching agent are other options.

The material is optionally bleached at about 20 to 100° C. for about five (5) to 200 min. The bleached material is then subjected to washing with water, followed by filtering with a screen. The screen can be any suitable size. In one embodiment, the screen has a mesh size of about 30 to 200 microns.

The filtered material containing solids can then be refined (e.g., in a plate refiner, stone mill, hammer mill, ball mill, or extruder.). In one embodiment, the filtered material entering the refiner (e.g., a plate refiner) contains about four percent (4%) solids. In another embodiment, the refining can take place in the absence of water being added. The plate refiner effectively shreds the particles to create microfibers. The plate refiner, which is also called a disk mill, comprises a main body with two ridged steel plates for grinding materials. One plate, a refining plate, is rotated while a second plate remains stationary. The plates define grooves that aid in grinding. One plate refiner is manufactured by Sprout Waldron of Muncy, Pa. and is Model 12-ICP. This plate refiner has a 60 horsepower motor that operates at 1775 rpm.

Water may be fed into the refiner to assist in keeping the solids flowing without plugging. Water assists in preventing the refiner's plates from overheating, which causes materials in the refiner to burn. (This is a concern regardless of the type of grinding or shearing device used.). The distance between the plates is adjustable on the refiner. To set refining plate distances, a numbered dial was affixed to the refining plate adjustment handle. The distance between the plates was measured with a micrometer, and the corresponding number on the dial was recorded. Several plate distances were evaluated and the setting number was recorded. A variety of flow consistencies were used in the refiner, which was adjusted by varying solids feed rate. The amount of water flowing through the refiner remained constant. Samples were sent through the refiner multiple times. In one embodiment the materials are passed one or more times through the plate refiner.

The microfibers may then be separated with a centrifuge to produce refined materials. The refined materials are then diluted in water until the solids content is about 0.5 to 37%. This material is then dispersed. In one embodiment, dispersing continues until a substantially uniform suspension is obtained, about 2 to 10 minutes. The uniform suspension reduces the likelihood of plugging.

The resulting dispersed refined materials, i.e., microparticles, may then be homogenized in any known high pressure homogenizer operating at a suitable pressure. In one embodiment, pressures greater than about 5,000 psi are used. The resulting highly refined cellulose (HRC) gel may display a lignin content of about 1 to 20% by weight, depending in part upon its original content.

The absence of use of a mild NaOH soaking before the refining step in the present invention prior to high pressure homogenization does not require the use of high temperature and high pressure cooking (high temperature means a temperature above 100 degrees C. and high pressure means a pressure above 14 psi absolute). High temperature and high pressure cooking may be used, but to the disadvantage of both economics and output of the product. This novel process further avoids the need for either mild concentrations of NaOH or of highly concentrated NaOH and the associated undesirable environmental impact of discharging waste water containing any amount of NaOH and organic compounds. The process also avoids a need for an extensive recovery system. In one embodiment, the pH of the discharge stream in the present invention is only about 8 to 9 and may even approach 7. The method of the present invention has the further advantage of reducing water usage significantly over prior art processes, using only about one third to one-half the amount of water as is used in conventional processes to produce to produce HRC gel and amounts even less than that used in the Chen processes All of the mechanical operations, refining, centrifuging, dispersing, and homogenizing could be viewed as optional, especially in the case of citrus pulp or other tree bearing fruit pulps. Additionally, other shearing operations can be used, such as an extruder, stone mill, ball mill, hammer mill, etc. For citrus pulp, the only processes that are needed to produce the expanded cell structure are to dry (using the novel drying process) and then properly hydrate the raw material prior to the expanding and shearing step of the process of the invention. This simple process could also be used in other raw material sources.

Hydration is a term that means reconstituting the dried fiber back to a hydrated state so that it has functionality similar to the pre-dried material. Hydration can be obtained using various means. For instance, hydration can occur instantly by placing the dry products in a solution followed by shearing the mixture. Examples of shearing devices are a high shear disperser, homogenizer, blender, ball mill, extruder, or stone mill. Another means to hydrate the dry materials is to put the dry product in a solution and mix the materials for a period of time using gentle or minimal agitation. Hydrating dry materials prior to use in a recipe can also be conducted on other insoluble fibrous materials to enhance their functionality.

The initial slurry of fibers/cells from the EPM products is difficult to dry. There is even disclosure in the art (e.g., U.S. Pat. Nos. 4,413,017 and 4,232,049) that slurries of such processed products cannot be easily dried without expensive and time consuming processes (such as freeze drying, extended flat bed drying, and the like). Freeze drying is effective, but is not economically and/or commercially desirable. Similarly, tray dryers may be used, but the length of time, labor and energy requirements make the process costly. The slurries of the citrus and/or beet by-products may be dried economically and effectively according to the following practices of the invention. Any type of convective drying method can be used, including a flash dryer, fluid bed dryer, spray dryer, etc. One example of a dryer that can be used is a fluid bed dryer, with dry material being added to the slurry to equilibrate the moisture content in the materials. It has been found that by adding 5:1 to 1:1 dry to wet materials within the fluid bed drier improves the air flow within the drier and the material may be effectively dried. In the absence of the combination of "dry" and "wet" materials, the slurry will tend to merely allow air to bubble through the mass, without effective drying and without a true fluid bed flow in the drier. The terms wet and dry are, of course, somewhat relative, but can be generally regarded as wet having at least (>40% water/<60% solid content] and dry material having less than 20% water/80% solid content). The amounts are not as critical as the impact that the proportional amounts of materials and their respective water contents have in enabling fluid flow within the fluid bed drier. These ranges are estimates. It is always possible to use "wet" material with lower moisture content, but that would have to have been obtained by an earlier drying or other water removal process. For purpose of economy, and not for enabling manufacture of HRC microfibers according to the present invention from citrus or beet by-product, it is more economical to use higher moisture content fiber mass as the wet material. After the mixture of wet and dry materials have been fluid bed dried (which can be done with air at a more moderate temperature than is needed with flat bed dryers (e.g., room temperature air with low RH may be used, as well as might heated air). A flash drier may also be used alternatively or in combination with a fluid bed drier to effect moisture reduction from the citrus or beet by-product prior to produce a functional dry product. It would be necessary, of course, to control the dwell time in the flash drier to effect the appropriate amount of moisture reduction and prevent burning. These steps may be provided by the primary or source manufacturer, or the product may be provided to an intermediate consumer who will perform this drying step to the specification of the process that is intended at that stage.

One aspect of the drying process is useful for the drying of any expanded cellulose products, especially for the drying of highly refined cellulose fibers and particles that have been extremely difficult or expensive to dry. Those products have been successfully dried primarily only with freeze drying as a commercially viable process. That process is expensive and energy intensive. A method according to the present invention for the drying of any expanded cellulose fiber or particle product comprises drying an expanded cellulose product by providing a first mass of expanded cellulose fiber product having a first moisture content as a weight of water per weight of fiber solids; providing a second mass of expanded cellulose fiber product having a second moisture content as a weight of water per weight of fiber solids, the second moisture content being at least 20% less than said first moisture content; combining said first mass of expanded cellulose fiber product and said second mass of expanded cellulose product to form a combined mass; drying said combined mass in a drying environment to form a dried combined mass. The method may have the dried combined mass dried to a moisture content of less than 20, less than 10, less than 8, less than 5 or less than 3 $H_2O$/g fiber mass. The method, by way of non-limiting examples, may use drying environments selected from the group consisting of, flash driers, fluid bed driers and combinations thereof.

The rehydration and shearing (particularly high shearing at levels of at least 10,000 $sec^{-1}$, preferably at least 15,000 $sec^{-1}$, more often, greater than 20,000, greater than 30,000, greater than 40,000, and conveniently more than 50,000 $sec^{-1}$ (which is the actual shearing rate used in some of the examples) of the dry fiber product enables the resultant sheared fiber to retain more moisture and to retain moisture more strongly. It has been noted in the use of materials according to the practice of the invention that when the fiber products of the invention are rehydrated, the water activity level of rehydrated fiber is reduced in the fiber (and the fiber present in a further composition) as compared to free water that would be added to the further composition, such as a food product. The food products that result from cooking with 0.1 to 50% by weight of the HRC fiber product of the invention present has been found to be highly acceptable to sensory (crust character, flavor/aroma, grain/texture, taste, odor, and freshness, especially for mixes, frozen foods, baked products, meat products and most particularly for bakery goods, bakery products, and meat products) tests on the products. Importantly, the products maintain their taste and mouth feel qualities longer because of the higher moisture retention.

Viscosity Measuring Procedure

Measure the viscosity using a Brookfield DV II+ viscometer using cylindrical spindles at 10 rpm with a 3% by weight solids/water solution at room temperature (25° C.±3 C.°) for 1 minute.

Any suitable amount of plant mass, fiber material (in particle or fiber or fibrid form) or highly refined cellulose effective to increase viscosity in the aqueous liquid may be used. In a preferred embodiment, the highly refined cellulose component is present in the aqueous liquid an amount sufficient to provide greater than or equal to about 0.005% w/w highly refined cellulose, more preferably from greater than about 0.1% w/w, and still more preferably from about 0.2% w/w to about 1% w/w highly refined cellulose concentration in the product. Unless otherwise specified, the concentrations of highly refined cellulose given herein are based on the weight of non-hydrated highly refined cellulose. No matter which process is used, any amount of highly refined cellulose effective to provide a measurable increase in viscosity (based on about 100% w/w of the liquid composition to which the enzymatically modified refined cellulose is added) from about 1% w/w to about 30% w/w composition, from about 30% w/w to about 80% w/w water, up to about 50% w/w composition, and from about 0.005% w/w to about 3.0% w/w highly refined cellulose, should be used.

Suitable aqueous plant mass, fiber or highly refined cellulose compositions are made by blending the components of the solution in water. In one embodiment, the plant mass, fiber or aqueous highly refined cellulose composition consists essentially of highly refined cellulose in water. As used herein, the term "water" generally refers to tap water, that is, water as available onsite without requiring purification that may contain minor amounts of components other than $H_2O$. However, any suitable water may be used.

The aqueous highly refined cellulose composition may, optionally, further comprise other components, such as for example, alkali metal silicates, alkali metal salts, such as for example, NaCl, KCl, and surfactants suitable for food use and other viscosity modifiers.

Also, in a preferred embodiment, the aqueous highly refined cellulose composition is at a temperature of from about 0 to about 85° C., more preferably from 0 to about 70° C., still more preferably from about 0° C. to about 50° C., and even more preferably from about 0° C. to about 20° C.

It should also be appreciated that the compositions of the solutions and methods used in the process of the invention may be varied according to the desired characteristics of the food product. The following non-limiting examples will further illustrate the preparation and performance of the invention. However, it is to be understood that these examples are given by way of illustration only and are not a limitation of the invention.

What is claimed:

1. A method of manufacturing a stabilized egg composition with steps of:
    providing a liquid mass of egg composition comprising both yolk and albumin;
    combining the liquid mass of egg composition with a highly refined cellulose fiber material present as at least 0.005% by weight of the liquid egg composition; and
    stirring the combined egg composition and fiber material into a foamed material and wherein the foamed material is dried into a dried foam composition, wherein the dried form composition is then ground into a powder.

2. The method of claim 1 wherein the foamed material flows as a liquid at 20° C. and 760 mm Hg atmospheric pressure and 40% relative humidity.

3. The method of claim 1 wherein a batch process is used in which whole eggs are first pasteurized at temperature greater than 141° F. and held at that temperature for greater than 3.5 min, then cooled to less than 40° F., and then combined with the highly refined cellulose fiber material.

4. The method of claim 1 wherein a continuous process is used in which whole eggs are first pasteurized at temperature greater than 141° F. and held at that temperature for greater than 3.5 min, then cooled to less than 40° F., and then combined with the highly refined cellulose fiber material.

5. A method of manufacturing a stabilized egg composition with steps of:
    providing a liquid mass of eta composition comprising both yolk and albumin;
    combining the liquid mass of egg composition with a highly refined cellulose fiber material present as at least 0.005% by weight of the liquid egg composition; and
    stirring the combined egg composition and fiber material into a foamed material and wherein the foamed material is dried into a dried foam composition,
    wherein whole eggs are first pasteurized at temperature greater than 141° F. and held at that temperature for greater than 3.5 min, then cooled to less than 40° F., and then combined with the highly refined cellulose fiber material, the dried foam composition is converted to a powder, and then the powder is packaged.

6. A method of manufacturing a stabilized egg composition with steps of:
    providing a liquid mass of egg composition consisting essentially of both yolk and albumin, sugar, and water;
    combining the liquid mass of egg composition with a highly refined cellulose fiber material present as at least 0.005% by weight of the mass of liquid egg composition; and
    stirring the liquid mass of combined egg composition and fiber material into a foamed material.

7. The method of claim 6 wherein the foamed material is dried into a dried foam composition.

8. The method of claim 6 wherein the foamed material is frozen.

9. A method of manufacturing a stabilized egg composition with steps of:
    providing a liquid mass of egg composition consisting essentially of both yolk and albumin, and water;
    combining the liquid mass of egg composition with a highly refined cellulose fiber material present as at least 0.005% by weight of the mass of liquid egg composition; and
    stirring the liquid mass of combined egg composition and fiber material into a foamed material.

10. The method of claim 9 wherein the foamed material is dried into a dried foam composition and the foamed material is frozen.

* * * * *